Jan. 23, 1962     E. A. LINK     3,018,415
CIRCUIT RECLOSER
Filed Dec. 31, 1956     2 Sheets-Sheet 1
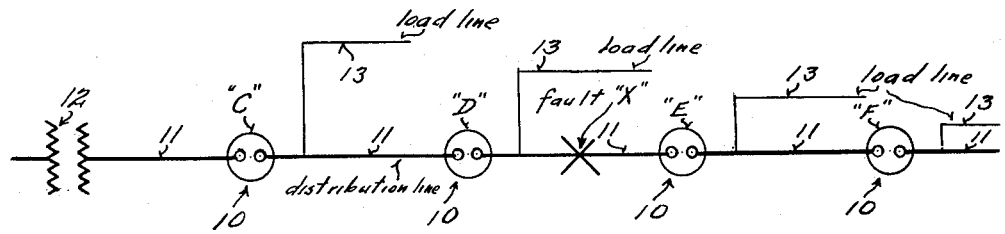
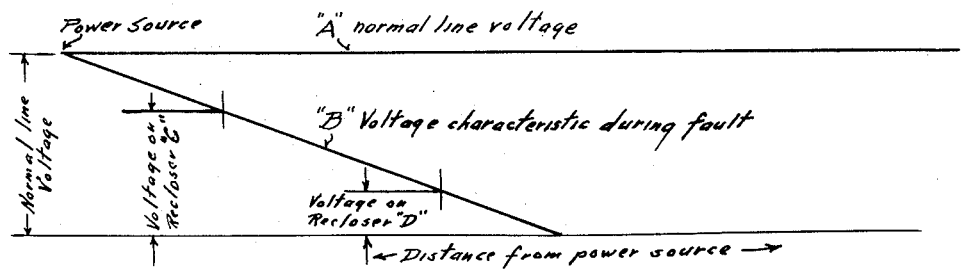
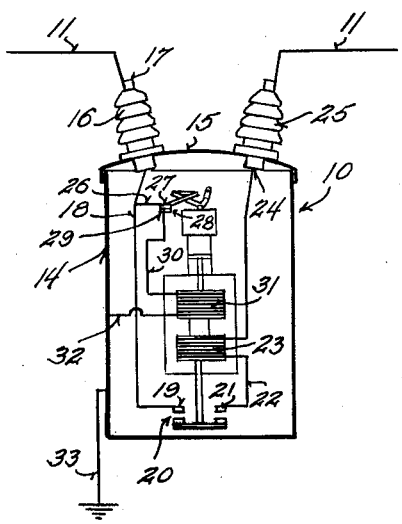
INVENTOR.
*Edwin A. Link*
BY
*Attorney*

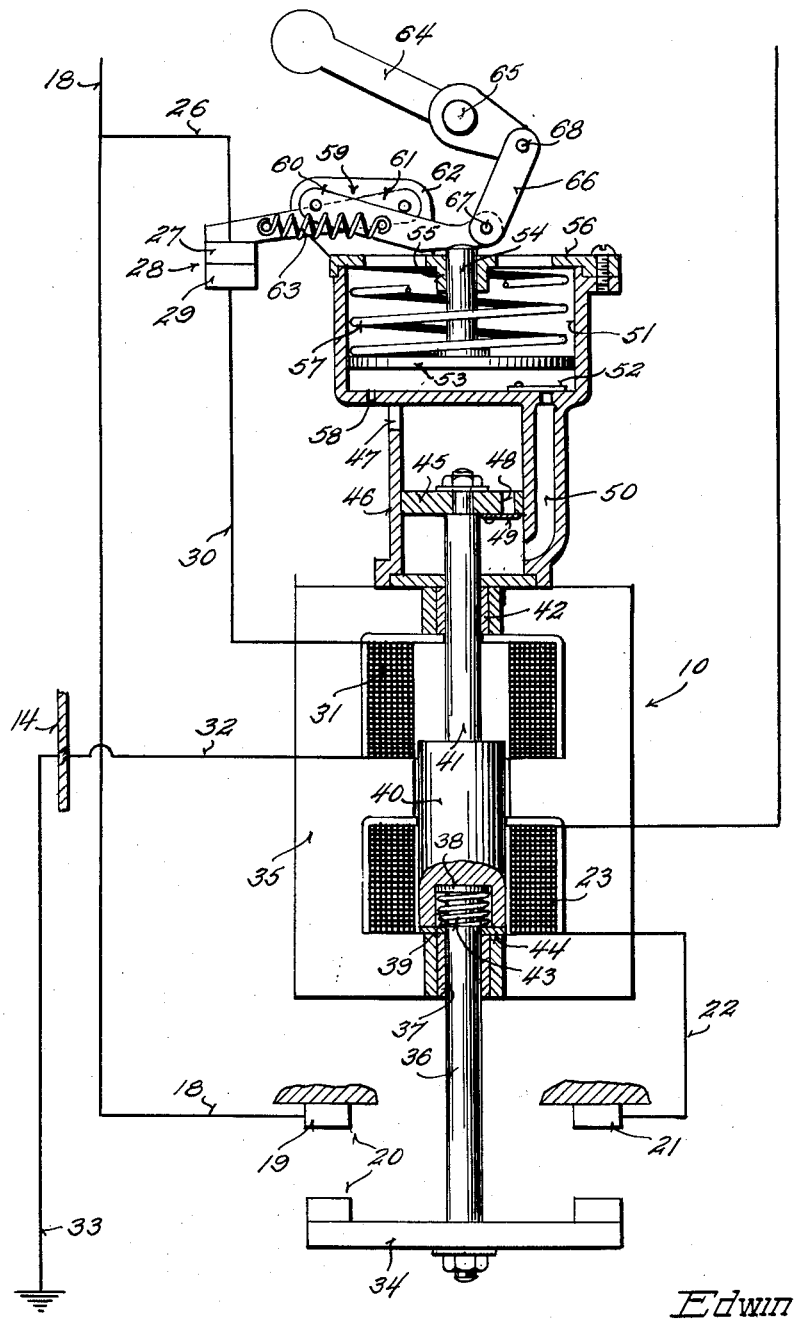

United States Patent Office 3,018,415
Patented Jan. 23, 1962

3,018,415
CIRCUIT RECLOSER
Edwin A. Link, Waukesha, Wis., assignor to R T & E Corporation, Waukesha, Wis., a corporation of Wisconsin
Filed Dec. 31, 1956, Ser. No. 631,677
10 Claims. (Cl. 317—23)

This invention relates to circuit reclosers adapted for use in power distribution line.

The circuit reclosers, embodying the teachings of the present invention, are adapted for series connection at spaced intervals along any power distribution line. Each of the reclosers is normally open when deenergized and includes a line voltage responsive means which, when energized at a predetermined potential, biases and normally maintains the recloser in closed position. Each of the reclosers is also provided with a current responsive means which, when energized, biases the recloser toward open position. Under the influence of a fault current in the distribution line, the biasing force of the current responsive means is of sufficient magnitude to overcome the biasing force of the voltage responsive means and effect the automatic opening of the recloser adjacent the fault in the direction of the power supply. The automatic opening of this recloser cuts off the power supply to the remaining reclosers located more remotely from the power supply than the fault with the result that these reclosers are deenergized and move to an open position. The open position of the several reclosers serve to sectionalize the load carrying portions of the distribution line between succesive pairs of open reclosers. After the correction of the fault and the manual reclosing of the initially opened recloser, the automatic reclosing of succeeding reclosers is serially affected after the predetermined line voltage has been reestablished following the pickup of the cold load in that portion of the distribution line between the last closed recloser and the next succeeding open recloser. When the line voltage in the reenergized portion of the distribution line is raised to a predetermined value after the cold load pickup has been effected, the line voltage will be impressed upon the voltage responsive means of the next succeeding recloser to effect its reclosing to energize the next succeeding sectionalized portion of the distribution line.

While numerous types of circuit breakers and reclosers have been employed for the purpose of providing the desired protection for equipment on a power distribution line, it has been learned from experience that the devices now in common use have certain shortcomings which leave something to be desired in the way of satisfactory performance of the devices for their intended purpose. One of the shortcomings of the devices now in common use lies in the fact that they have different operating characteristics which require that to be effective they must be properly coordinated in the line. Another shortcoming of the type of equipment currently in use lies in the fact that the protection which they afford in any given line is limited by the individual ratings of the devices and their coordinated relationship. Another shortcoming of circuit breakers and reclosers now in common use lies in the fact that all circuit breakers and reclosers, except those which have been manually opened or locked out, due to fault, remain in closed position even after they have been deenergized. Many of these devices incorporate either hydraulic, or thermo-responsive or similar means for timing the reclosing operation of successive devices along the line. In instances where time delay reclosing mechanism is incorporated in the devices, it is necessary that the position of the devices in the line be so arranged that their reclosing operations take place in correct sequence as dictated by the variations in time delay mechanisms of the several reclosers.

A brief discussion of the operation resulting from a fault in a power distribution line equipped with previously known circuit breakers and reclosers will emphasize one of the marked shortcomings resulting from their use in any system. Either the automatic operation of one of the reclosers under a fault condition, or the manual opening of a recloser for the purpose of making repairs, will effect the opening only of the recloser under consideration. The remaining circuit breakers or reclosers along the line all remain in closed condition with the result that when the fault has been corrected, or the repairs completed, the manual reclosing of the open recloser places an excessive current demand on the line in the attempt to reenergize the entire cold load in the form of furnaces, space heaters, ranges, refrigerators, water heaters, and like equipment which have been deenergized during the outage. When a condition such as this has been brought about by the opening of a recloser along the distribution line, it requires that the service man follow the remainder of the line, possibly for many miles, to effect the manual opening of each of the remaining reclosers. He must then return to the original open recloser to close it and then retrace his travel and manually close each succeeding recloser on the line to effect the pickup of the cold load successively between each adjacent pair of open reclosers.

The primary object of the present invention resides in the provision of a new and improved circuit recloser adapted to function in a manner which will overcome the shortcomings of equipment now in general use for the intended purpose.

Another object of the invention resides in the provision in a circuit recloser of operating means including line voltage responsive means and current responsive means disposed in opposed relationship to control the opening and closing of the device in accordance with the relationship between the line voltage and the load current in that portion of the distribution line served by the particular recloser.

Another object of the invention resides in the provision in a circuit recloser of voltage responsive means effective, when energized at a predetermined potential, to reclose the open recloser to reenergize a portion of the distribution line.

Another object of the invention resides in the provision in a circuit recloser of current responsive means actuated by the occurrence of a fault in the distribution line to effect the opening of the circuit.

Another object of the invention resides in the provision in a circuit recloser, including separate opposed line voltage and current responsixe means, of cycling means operative to permit a predetermined number of automatic opening and closing operations prior to effecting a locking of the device in open position.

Another object of the invention resides in the provision in a power distribution line of a plurality of circuit reclosers, which are normally open when deenergized, arranged in series and in spaced relationship along the distribution line and respectively in series with tap feeder lines so that a fault in the distribution line will effect the opening of the nearest recloser, in the direction of the power supply, to cut off power to the remainder of the power distribution line.

Another object of the invention resides in the provision in each circuit recloser of current responsive means actuated by a fault in the line to effect the opening of the circuit recloser nearest the fault and cause the opening of successive reclosers disposed at points more remote from the power source than that at which the fault occurred.

Another object of the invention resides in the provision of voltage responsive means in each of the circuit reclosers, which, when deenergized, permits opening of the associated switch to isolate that section of the distribution line served by the particular recloser.

Another object of the invention resides in the provision in each recloser of voltage responsive means which is rendered effective only upon the reestablishment of normal line voltage in that portion of the distribution line which lies closer to the power source to effect reclosing of the electrical circuit to that section of the distribution line served by it.

Another object of the invention resides in the provision in a power distribution line of a plurality of reclosers disposed in spaced relationship along the line, which function when open to sectionalize the several portions of the power distribution line disposed between successive reclosers.

Another object of the invention resides in the provision in a power distribution line of a plurality of circuit reclosers adapted to be successively reclosed, in accordance with their remoteness from the power source, on corrected fault in the line to effect the step by step pickup of cold loads energized by the closing of the circuit and the reestablishment of normal line voltage in that portion of the circuit which the preceding recloser serves.

Another object of the invention resides in the provision in a power distribution line of a plurality of reclosers each including voltage responsive means, operative to close only upon the reestablishment of normal line voltage in that section of the power distribution line served by the preceding recloser whereby the cold loads of successive portions of the power distribution line are reconnected to the power distribution line only upon return of the preceding portion of the power distribution line to its normal line voltage level.

Another object of the present invention resides in the fact that under the teachings of the present invention all of the reclosers in a given line may have the identical rating.

Another object of the present invention resides in the obtaining of more successful steps of coordination in a power distribution line.

Another object of the invention resides in the provision of a new and improved circuit recloser wherein the opening force resulting from a manually opening operation is a function of the line current.

Another object of the invention resides in the provision of a new and improved circuit recloser wherein the more severe the fault the more effective and rapid is the action of the recloser to interrupt the line service.

Other objects and advantages will become apparent from the following description of an illustrative embodiment of the present invention.

In the drawing:

FIGURE 1 is a schematic diagram of part of a power distribution line provided with a plurality of spaced reclosers constructed in accordance with the teachings of the present invention;

FIG. 2 is a diagrammatic showing of the normal line voltage in the system and also illustrating the drop in line voltage between the source of power and the point at which a fault occurs in the line;

FIG. 3 is an elevational view of one of the reclosers and including a diagrammatic showing of parts of the reclosers; and FIG. 4 is an enlarged vertical sectional view illustrating the structure of the present recloser and including a diagrammatic showing of electrical connections between the power and load lines of the distribution system.

Before entering into a detailed description of the illustrative embodiment of the present invention, it is believed advisable to describe the general purpose, use and function of the present recloser.

Power distribution lines generally include circuit interrupters between the power source and the end of the distribution line adapted to function in a manner to cut off the flow of power in the line when a fault occurs.

In the event that the outage is of a temporary nature in the form of a short circuit caused by an arc over an insulator, sleet or wind causing momentary contact between wires, the fault will result in the opening of the nearest recloser in the direction of the power source under the influence of the increased effect of the load current which overcomes the effect of the line voltage on the recloser causing movement of the bridging contact member of the recloser to open the circuit between the power and load line contacts of the recloser switch. If the fault corrects itself immediately, the load circuit on the recloser will be reduced to a normal value and the line voltage will effect the prompt reclosing of the recloser. Should the temporary fault reoccur several times in reasonable rapid succession, the multiple or repeated operations of the recloser will effect the locking out of the recloser in open position in a manner to be hereinafter more specifically described. In the event that the outage results from a permanent fault in the line, the fault will result in the opening of the recloser in the direction of the power source under the influence of the increased effect of the load current which overcomes the effect of the line voltage on the recloser causing movement of the bridging contact member of the recloser to open the circuit between the power and load line contacts of the recloser switch. Since the permanent fault breaks the power line current to the remaining reclosers which are positioned at points more remote from the power supply than the point of the fault, each of the remaining reclosers will be deenergized and respectively moved to their open position.

With the embodiment of the present invention in the power distribution line, it is possible to correct the fault and have succeeding portions of the cold load picked up successively without requiring manual closing operation on each of the succeeding reclosers. In the present instance, after the repair of the fault, the recloser is manually closed to reenergize that portion of the distribution line between the nearest recloser to the fault, and the next succeeding recloser which is more remote from the power source. The reenergization of this portion of the circuit will permit the flow of current to supply the demand of the various pieces of equipment in this particular section of the distribution system. The current demand of the cold load in the reenergized portion of the distribution system is such that the line voltage is reduced during the pickup of the cold load. When the line voltage builds up to its predeterminned operating potential, and the demands of the cold load in this particular section of the distribution line have been satisfied, the reestablished line voltage will be impressed upon the next succeeding recloser to effect its reclosing operation. The closing operation of the next succeeding recloser will immediately energize the line between it and the next remote recloser to pick up the cold load energized by this portion of the distribution system circuit in the manner previously described. The energization of the cold load in this portion of the distribution circuit will cause some voltage drop so that the next succeeding recloser will not close until such time as the line voltage has been raised to the normal operating level of the distribution line. When the normal operating line voltage has been reestablished in the newly energized section of the distribution line, it will effect the reclosing of the next succeeding recloser to pick up the cold load in the next section of the distribution line. This operation continues automatically to successively pick up the cold load in the succeeding sectionalized portions of the distribution line disposed between each succeeding pair of reclosers.

Referring more particularly to FIG. 1 of the accompanying drawing, it will be noted that a plurality of reclosers 10 are connected in series in spaced relationship along the distribution line 11 which is energized from any suitable power source 12, such as a sub-station. A plurality of load lines 13 are connected to the distribution line 11 at spaced intervals between succeeding reclosers 10. Any type of equipment (not shown) may be connected to the several load lines 13. The spaced positioning of the several reclosers along the distribution line 11 serve to divide or sectionalize the distribution line into individual load supplying portions.

When the distribution line 11 is supplied with energy at a normal line voltage, as indicated by the curve A in FIG. 2 of the accompanying drawing, each of the reclosers 10 assumes its closed position to energize the various equipment connected to the several load lines 13 of the distribution circuit. Should a fault occur anywhere along the distribution line, such as at the point "X" (see FIG. 1) between the second and third reclosers 10, the current in the distribution line 11 at the fault X rises to a short circuit value. This short circuit current is common to both first and second reclosers 10, in the distribution line 11. The voltage characteristic during the fault is represented by the curve B of FIG. 2 from which it will be noted that the voltage impressed upon the second recloser is considerably less than that impressed upon the first recloser 10 in the distribution line 11. Since the voltage responsive elements on the reclosers provide the motivating force for maintaining the switch of each device in closed operating position, the marked reduction in the voltage applied to the recloser 10 nearest the fault will result in the material lessening of the force which normally holds the recloser in closed position. At the same time the current responsive means of the recloser 10 nearest the fault will be greatly increased due to the short circuit value resulting from the fault X. The increased current caused by the fault in the load line 13 provides a motivating force which overcomes the reduced potential of the distribution line 11 to effect the opening of the recloser 10.

Should the fault in the load be of a temporary nature, such as a short circuit caused by an arc over an insulator, or some similar condition, the normal line voltage will be promptly reestablished as soon as the temporary fault disappears, and the recloser will automatically move to closed position, under the influence of normal line voltage, to again complete the circuit. Should the temporary fault reoccur several times in rapid sequence, or become permanent in its nature, the recloser is constructed in a manner to effect a lock-out of the device in open circuit breaking position in a manner to be hereinafter more specifically described.

Reference to FIG. 3 of the accompanying drawing will provide the basis for a detailed description of the general structure and mode of operation of the device chosen for illustrative purposes. Each of the reclosers 10 is housed in an oil filled metal casing 14 provided with a removable cover 15 which forms the support for the operating mechanism of the device. A suitable insulating bushing 16 mounted on the cover 15 is provided at its upper end with a terminal 17 to which the power line 11 may be connected. The lower end of the terminal 17 is electrically connected by a lead 18 to one fixed contact 19 of a switch 20. A second fixed contact 21 of the switch 20 is electrically connected by a lead 22 to one end of a current responsive coil 23. The other end of the coil 23 is electrically connected to the lower extremity of a terminal 24 mounted in an insulating bushing 25 carried by the cover portion 15 of the casing 14. The upper end of the terminal 24 provides a connecting means for the load line 13.

A branch lead 26 carries current from the lead 18 to a movable contact 27 of a switch 28 having its fixed contact 29 electrically connected to a lead 30 to one end of a voltage responsive coil 31. The other end of the voltage responsive coil is connected by a lead 32 to the casing 14 which in turn is connected to ground through a lead 33.

A movable bridging contact member 34 is positioned in a manner to selectively connect or disconnect the fixed contacts 19 and 21 of the switch 20. In accordance with the dictates of the current responsive coil 23, and the voltage responsive coil 31, in a manner to be hereinafter more specifically described.

Reference to FIG. 4, which is an enlarged view of the operating mechanism of one of identical reclosers 10, will serve adequately to describe both the structure and operation of the recloser. From this figure it will be noted that the current responsive coil 23 and the voltage responsive coil 31 are mounted in spaced relationship and in axial alignment on a support 35 carried in any approved manner by the removable cover 15 of the casing 14. The movable bridging contact member 34 of the switch 20 is provided with a stem 36 mounted for vertical sliding movement in a bearing 37 disposed below the current responsive coil 23. The upper end of the stem 36 is provided with a flange 38 guided for movement in a bore 39 formed in the lower portion of an armature 40 having a stem 41 guided for vertical sliding movement in a bearing 42 disposed above the voltage responsive coil 31. A coil spring 43 disposed between the flange 38 of the stem 36 and a cover plate 44 forming a closure for the bore 39 of the armature 40 provides a yieldable means to maintain the switch 20 in closed position and compensate for any overtravel of the armature 40 in its vertical movement within the hollow centers of the axially aligned current responsive coil 23 and the voltage responsive coil 31.

The vertical positioning of the armature 40 and its associated guide means permits gravitational movement of the bridging contact element 34 to an open position breaking the electrical connection between the fixed contacts 19 and 21 of the switch 20 when neither the current responsive coil 23, or the voltage responsive coil 31, are energized. Should the armature 40 be disposed in a position other than vertical, mechanical biasing means in the form of a spring or weight (not shown) would replace the gravity biasing means to maintain the switch 20 in open position when neither of the coils 23 and 31 are energized.

When the contacts 27 and 29 of the switch 28 are closed, the normal potential of the distribution line 11 is impressed upon the voltage responsive coil 31, with the result that the armature 40 and the associated movable bridging contact element 34 is urged upwardly to normally maintain the end portions of the bridging contact element 34 in electrical connection with the fixed contacts 19 and 21 of the switch 20 to close the circuit between the distribution line 11 and the associated load line 13.

When a load is connected to the line 13, the current responsive coil 31 is energized in accordance with the load current, with the result that a force is applied to the armature 40 and the associated movable bridging contact member 34, which opposes the force exerted by the voltage responsive coil 31. The force applied upon the movable bridging contact element 34 by the energized voltage responsive coil 31 is of sufficient strength to normally maintain the element 34 in bridging contact between the fixed contacts 19 and 21 of the switch 20 in opposition to the force applied to the armature 40 under the influence of the current responsive coil 23 when the line 13 is carrying a normal load.

Should a fault occur in the load line 13, the resulting current flow through the coil 23 will promptly overcome the force of the voltage responsive coil 31 to effect downward movement of the armature 40 and the associated bridging contact member 34 to disconnect the electrical connection between the contacts 19 and 21 of the switch 20. The breaking of the switch 20 will deenergize the load line 13 and the voltage responsive coil 31, which is still energized, will promptly effect the reclosing of the switch 20 to reenergize the associated load line 13. Should the fault still persist in the load line 13, the current responsive coil 23 will again effect the reopening of the switch 20 in the manner previously described.

In order to control the cyclic opening and reclosing of the switch 20, suitable means is provided in the form of control mechanism.

In the present instance, the control mechanism for limiting successive opening and reclosing operations of the switch 20 comprises a piston 45 mounted on the upper extremity of the stem 41. The piston is slidably received in a cylinder 46 mounted in any approved manner on the support 35 which forms the mounting means for the coils 23 and 31. A port 47 formed in the wall of the cylinder 46, adjacent its upper end, is in open communication with the oil filled casing 14 of the recloser 10, to normally maintain the upper portion of the cylinder 46 filled with oil. The piston 45 is provided with a passage 48 controlled by a check-valve 49 which permits oil to flow through the piston 45 when the same is moved upwardly under the influence of the voltage responsive coil 31 for the purpose of maintaining the lower position of the cylinder 46 filled with oil. When the current responsive coil 23 initiates downward movement of the armature 40 to effect the opening of the switch 20, the oil trapped beneath the piston 45 is discharged through a passage 50 into a cylinder 51 disposed above the cylinder 46. The mouth of the passage 50 is provided with a check-valve 52 which permits the flow of oil from the cylinder 46 to the cylinder 51, but prevents flow of oil from the cylinder 51 back to the cylinder 46. The cylinder 51 includes a piston 53 provided with an upwardly extending piston rod 54 guided for vertical movement in a bearing 55 formed in a cap 56. The piston 53 is normally urged downwardly through the action of a compression spring 57 disposed between the lower surface of the cap 56 and the upper surface of the piston 53. The cylinder 51 is provided at its lower extremity with a discharge orifice 58 in open communication with the body of oil contained in the casing 14. The orifice 58 is of such size as to permit the metered discharge of oil from the cylinder 51 under the pressure of the coil spring 57 that normally urges the piston 53 toward the lower extremity of the cylinder 51. Rapid repeated opening and reclosing operations of the switch 20 results in the raising of the piston 53 in the cylinder 51 and the elevating of the upper extremity of the piston rod 54, so that after a predetermined number of cycles of operation of the switch 20, the switch 28 is moved to locked open position under the influence of the piston rod 54.

The mechanism provided for effecting the breaking of the contacts 27 and 29 of the switch 28 comprises a toggle mechanism 59 including a pair of oppositely directed rockable levers 60 and 61, each having one end supported on one of a pair of pins disposed in spaced relationship on a bracket 62 positioned above and adjacent the cylinder 51 having their intermediate portions connected by a tension spring 63. The free end of the lever 60 is disposed to contact the upper extremity of the piston rod 54 so that movement of the piston 53 will effect movement of the lever 60. The free end of the lever 61 carries the movable contact 27 of the switch 28. The toggle mechanism 59 is effective in one over center position to close the contacts 27 and 29 of the switch 28, and in its other over center position to effect the opening of the switch 28. After a predetermined number of cycles of opening and reclosing the switch 20, the accumulation of oil in the cylinder 51, raises the piston 53 and rod 54 to move the free end of the lever 60 to an over center position which causes the snap action opening of the switch 28 to cut off the electrical current utilized to energize the voltage responsive coil 31.

Mechanical means is provided for reclosing the switch 28 after the fault has been corrected. The mechanical means for effecting the manual reclosing of the switch 28 comprises a lever 64 journalled for rocking movement, intermediate its ends, on a pin 65 fixedly positioned in a suitable support. A lever 66, having its ends rockably mounted on pins 67 and 68 respectively, carried by the free end of the lever 60 and one end of the lever 66, provides a mechanical connection between the lever 66 and the lever 60. Upward movement of the outer end of the lever 66 effects the downward movement of the free end of the lever 60 to a position in which the tension spring 61 effects the reclosing of the contacts 27 and 29 of the switch 28 to reenergize the voltage responsive coil 31 of the device. The time required for locating and repairing the fault on the distribution line being sufficient to permit the escape of oil from the cylinder 51, through the discharge orifice 58, under the action of the coil spring 57 which normally urges the piston 53 to its lowermost position in the cylinder 51.

The reenergization of the voltage responsive coil 31 results in the closing of the switch 20 to reenergize that portion of the load line connected to the recloser 10 which has been manually reclosed.

Referring to the distribution system shown in FIG. 1 of the accompanying drawing, the several reclosers 10, which are connected in series along the distribution line 11, have been designated as "C," "D," "E" and "F," in the order of their remoteness from the power source 12. Should the fault "X" occur between the recloser "D" and "E," the fault current impressed upon the current responsive coil 23 of the recloser "D" will result in the automatic opening of the switch 20 of the recloser "D." The opening of the circuit at the switch 20 of the recloser "D" will automatically cut off the supply of line voltage to the voltage responsive coils 31 of the successive reclosers "E" and "F," with the result that the switches 20 of the reclosers "E" and "F" will open automatically under the influence of gravity.

After the fault adjacent the recloser "D" has been corrected, and the lever 66 has been actuated to effect the reclosing of the switch 28 of the recloser "D," the voltage responsive coil 31 of this recloser will again be energized to effect the closing of the switch 20 to reenergize that portion of the distribution system between the reclosers "D" and "E." Since the current demand of the cold load on the portion of the distribution line, reenergized by the closing of the switch 20 of the recloser "D," is of considerable magnitude, there will be a sufficient drop in voltage in the reclosed portion of the distribution line to preclude the reenergization of the voltage responsive coil 31 in the next succeeding recloser "E" to preclude its operation to effect the reclosing of the switch 20 of the recloser "E" until such time as the voltage in a previously reclosed portion of the distribution line has reached that of normal line voltage. When the normal line voltage has been reestablished in the reclosed portion of the distribution circuit, and the voltage responsive coil 31 of the recloser "E" has been energized at the normal line potential, the switch 20 of the recloser "E" will be closed to energize that portion of the distribution line between the reclosers "E" and "F." When the line voltage on the portion of the distribution line 11, between the recloser "E" and "F" reaches its normal operating potential, the switch 20 of the recloser "F" will automatically close to energize the next succeeding portion of the distribution line.

By reason of the successive operations of the several reclosers "D," "E" and "F," it will be noted that the distribution line has been sectionalized in a manner such that the cold loads of the individual sections are picked up successively to effect the automatic step by step reenergization of successive portions of the load in the several separate sections of the distribution line without requiring the manual operation of the successive reclosers in order to reestablish service along the various points of the distribution line.

From the foregoing description of the illustrative embodiment of the present invention, it will be understood that a circuit recloser has been provided which is responsive to the presence of a predetermined load line voltage to maintain the switch in closed position and which is responsive to fault current to effect the opening of the switch. It should also be noted that the inclusion in a power distribution line of a plurality of these reclosers, disposed in spaced relationship along the power distribution line, will provide a simple and effective means responsive to the fault in the line to isolate the fault and the succeeding sections of the line from the power source. A power distribution line equipped with a plurality of circuit reclosers embodying the teachings of the present invention provides a simple and effective means whereby the sectionalized portions of the power distribution line between successive reclosers are operative to successively pick up the cold load in each successive section of the distribution line after a fault has been corrected and the recloser nearest the fault has been manually reclosed. It should also be noted that reclosing of successive portions of the power distribution line will be automatically effected only after the line voltage in the preceeding energized section of the system has regained its normal operating line voltage. By reason of this condition, it is possible, after the correction of a fault, and the manual resetting of the recloser nearest the fault, to have the remainder of the distribution circuit reenergized automatically in sections, each having cold loads which, if combined, would preclude reenergization of the system without necessitating the separate manual reclosing of successive portions of the system.

It should also be noted that the reclosers of the present invention provide a simple and effective means whereby the presence of a fault current in the power distribution line effects the automatic opening of the recloser nearest the fault in the direction of the power source and the subsequent opening of all other reclosers in the distribution line which are more remote from the power source than the position of the fault. Furthermore, with the use of reclosers, constructed in accordance with the teachings of the present invention, it is possible to have all of the reclosers of identical rating in a given power distribution line. With the use of the present reclosers, it will be noted that the more severe the fault the more effective and rapid is the action of the recloser to interrupt the line service.

While numerous advantages of the present circuit recloser have been described in considerable detail in the foregoing specification, it is to be understood that various changes may be made in its embodiment without departing from or sacrificing any of the advantages hereinafter claimed.

I claim:

1. A circuit recloser comprising a line contact, a load contact, a movable contact bridging member, biasing means for normally maintaining said contact bridging member in open position, an operating member for said movable contact bridging member, a line voltage responsive means for imposing a force on said operating member proportionate to the line voltage for biasing said operating member and movable contact bridging member to closed position when the line voltage reaches a predetermined potential, and load current responsive means for imposing an opposing force on said operating member proportionate to the load current for biasing said operating member and movable contact bridging member to open position to interrupt said load current in response to a load current which is of sufficient magnitude to overcome the biasing force of said line voltage responsive means on said operating member.

2. A circuit recloser comprising a line contact, a load contact, a movable contact bridging member, biasing means operative to normally maintain said contact bridging member in open position, an operating member for said movable contact bridging member, and opposed biasing means effective upon said operating member for controlling the position of said movable bridging member with respect to said line and load contacts, one of said opposed biasing means comprising a line voltage responsive means for biasing said operating member and said movable contact bridging member to closed position under a predetermined line voltage, and the other of said biasing means comprising a load current responsive means for biasing said operating member and movable contact bridging member to open position wherein said load current is interrupted in response to a load current which overcomes the biasing force of said line voltage responsive means.

3. A circuit recloser comprising a line contact, a load contact, a movable bridging contact member, an operating member for said movable bridging contact member, said recloser being normally open when in deenergized condition, a line voltage responsive means operative when energized at a predetermined potential to bias said operating member and normally maintain said movable contact bridging member in closed position, and load current responsive means operative when energized to apply a biasing force on said operating member and movable contact bridging member in opposition to the force applied by said voltage responsive means on said operating member, said current responsive means becoming operative upon the occurrence of a load current of sufficient magnitude to overcome the biasing force of said line voltage responsive means to bias said movable contact bridging member to open position to thereby interrupt said load current.

4. A circuit recloser comprising a line contact, a load contact, a movable bridging contact member, an operating member for said movable bridging contact member, said circuit recloser being normally open when in deenergized condition, and opposed biasing means effective on said operating member for said movable bridging contact member to control its position with respect to said line and load contacts, one of said biasing means comprising a line voltage responsive means operative on said operating member when energized at a predetermined potential to move said contact bridging member to closed position, and the other of said biasing means comprising a load current responsive means operative on said operating member when energized to apply a biasing force in opposition to that applied by said line voltage responsive means, said load current responsive means becoming effective under a load current of sufficient magnitude to overcome the biasing force of said line voltage responsive means to effect the movement of said contact bridging member to open position to thereby interrupt said load current.

5. A circuit recloser comprising a unitary structure including a line contact, a load contact, a movable contact bridging member, biasing means operative to normally maintain said contact bridging member in open position, an operating member for said movable contact bridging member, and opposed biasing means comprising a line voltage responsive means operative when energized at a predetermined potential to bias said operating member and normally maintain said movable contact bridging member in closed position, and a load current responsive means for applying an opposing biasing force on said operating member for said movable contact bridging member, said current responsive means becoming effective only upon the occurrence of a load current of sufficient magnitude to overcome the opposing biasing force of said line voltage responsive means on said operating member to effect movement of said contact bridging member to open position to thereby interrupt said load current.

6. A normally open circuit recloser comprising a unitary structure including a line contact, a load contact, a movable contact bridging member, an operating member for said movable contact bridging member, biasing means operative to normally maintain said contact bridging member in open position, a line voltage responsive means operative when energized at a predetermined potential to bias said operating member to normally maintain said movable contact bridging member in closed position, and a load current responsive means operative when energized to apply a biasing force on said movable contact bridging member in opposition to the force applied by said voltage responsive means, the biasing effect of said current responsive means becoming operative upon the occurrence of a load current of sufficient magnitude to overcome the opposed biasing force of said line voltage responsive means on said operating member to bias said movable contact bridging member to open position wherein said load current is interrupted.

7. A circuit recloser comprising a line contact, a load contact, a movable contact bridging member, biasing means operative to normally maintain said contact bridging member in open position, an operating member for said movable bridging contact member, said operating member forming the armature of a solenoid, a coil surrounding said armature responsive to line voltage for imposing a force on said operating member proportionate to the line voltage for biasing said operating member and movable contact bridging member to closed position, and a coil surrounding said armature responsive to load current for imposing and opposing biasing forced on said operating member and movable contact bridging member to open position wherein said load current is interrupted when the load current is of sufficient magnitude to overcome the opposing biasing force of said line voltage coil on said operating member.

8. A circuit recloser comprising a line contact, a load contact, a movable contact bridging member, biasing means operative to normally maintain said contact bridging member in open position, an operating member for said movable contact bridging member, said operating member comprising the armature of a solenoid including a pair of axially aligned coils, one of said coils being responsive to a predetermined line voltage for biasing said operating member and movable contact bridging member to closed position, the other of said coils being responsive to load current for biasing said operating member and movable contact bridging member to open position to thereby interrupt said load current when the load current is of sufficient magnitude to overcome the opposing biasing force imposed by said voltage coil on said operating member.

9. A circuit recloser comprising a line contact, a load contact, a movable contact bridging member, biasing means operative to normally maintain said contact bridging member in open position, an operating member for said movable contact bridging member, said operating member forming the armature of a solenoid, said solenoid including one coil energized by line voltage, and a second coil energized by load current, said line voltage coil serving when energized at a predetermined voltage to bias said operating member and movable contact bridging member to closed position, said load current coil being responsive to a fault current of sufficient magnitude to overcome the opposing biasing force of said line voltage coil on said operating member to bias said operating member and movable contact bridging member to open position to thereby interrupt said load current.

10. A circuit recloser comprising a line contact, a load contact, a movable contact bridging member, biasing means operative to normally maintain said contact bridging member in open position, an operating member for said movable bridging contact member, a voltage responsive coil associated with said operating member to bias said movable contact bridging member to closed position, and a current responsive coil associated with said operating member to bias said movable contact bridging member to open position, said voltage responsive means serving when energized at a predetermined voltage to bias said operating member to normally maintain said movable contact bridging member in closed position, said current responsive means serving to apply an opposing biasing force on said operating member when responding to fault current demands of sufficient magnitude to overcome the opposing biasing force of said voltage responsive means on said operating member to effect the movement of said contact bridging member to open position to interrupt said load current.

References Cited in the file of this patent
UNITED STATES PATENTS

| | | |
|---|---|---|
| 1,292,585 | Crichton | Jan. 28, 1919 |
| 1,676,315 | Anderson | July 10, 1928 |
| 1,747,096 | White | Feb. 11, 1930 |
| 2,620,382 | Van Ryan | Dec. 2, 1952 |
| 2,654,053 | Wallace | Sept. 29, 1953 |
| 2,763,815 | Wallace | Sept. 18, 1956 |
| 2,795,671 | Edwards | June 11, 1957 |

FOREIGN PATENTS

| | | |
|---|---|---|
| 269,759 | Germany | Jan. 30, 1914 |
| 132,721 | Switzerland | Apr. 30, 1929 |
| 581,788 | Germany | Aug. 2, 1933 |

UNITED STATES PATENT OFFICE
CERTIFICATE OF CORRECTION

Patent No. 3,018,415　　　　　　　　　　　　　　　January 23, 1962

Edwin A. Link

It is hereby certified that error appears in the above numbered patent requiring correction and that the said Letters Patent should read as corrected below.

Column 12, lines 20, 24 and 27, for "means", each occurrence, read -- coil --; line 25, for "fault" read -- load --; same column 12, line 26, strike out "demands".

Signed and sealed this 1st day of May 1962.

(SEAL)
Attest:

ERNEST W. SWIDER
Attesting Officer

DAVID L. LADD
Commissioner of Patents